No. 865,097. PATENTED SEPT. 3, 1907.
E. FRANKE.
LAWN MOWER.
APPLICATION FILED OCT. 7, 1905.
2 SHEETS—SHEET 1.
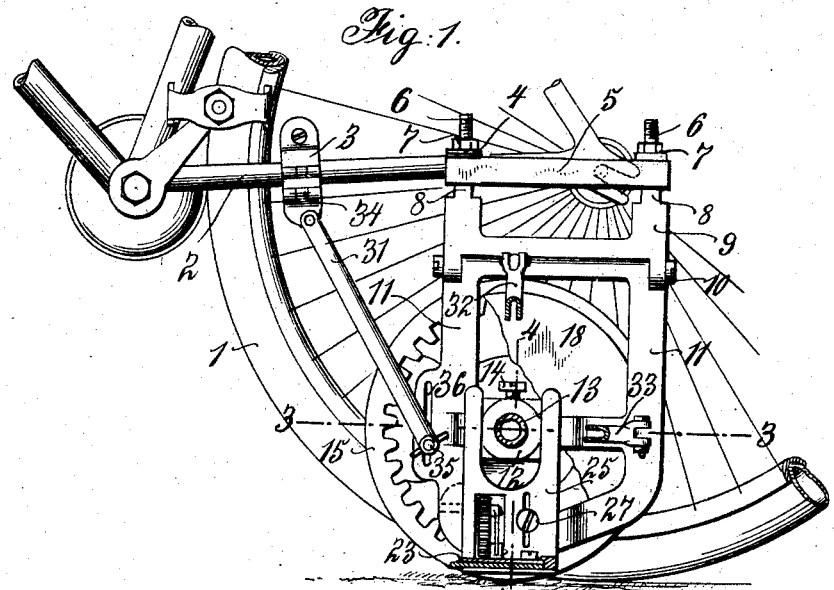
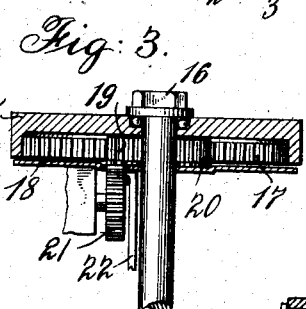
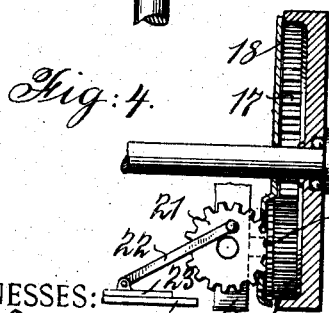
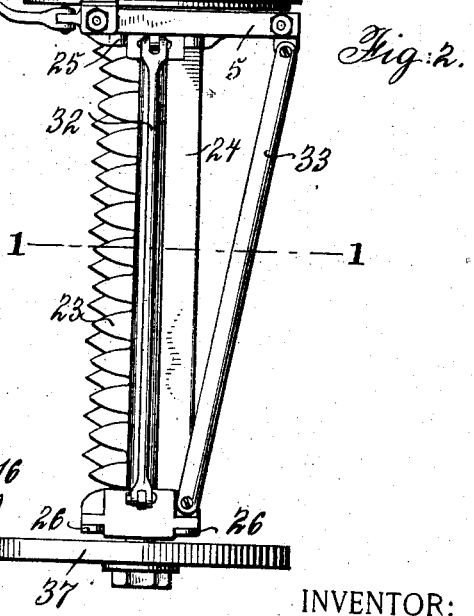
WITNESSES:
James F. Duhamel
W. H. Crichton-Clarke
INVENTOR:
Emil Franke,
By his Attorney
Victor J. Evans No. 865,097. PATENTED SEPT. 3, 1907.
E. FRANKE.
LAWN MOWER.
APPLICATION FILED OCT. 7, 1905.
2 SHEETS—SHEET 2.
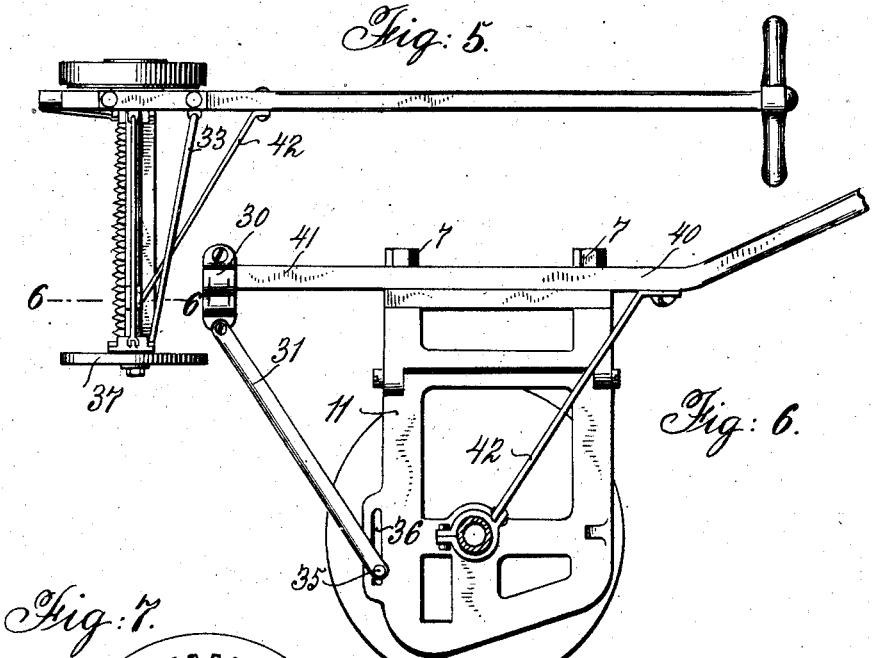
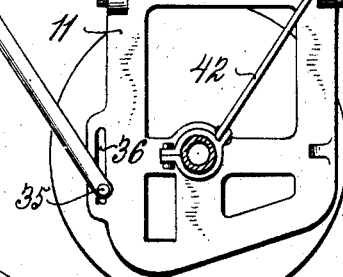
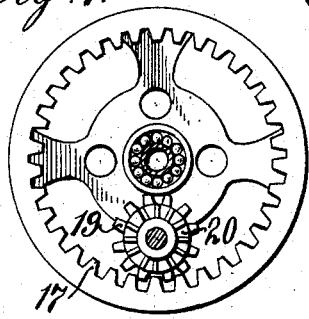
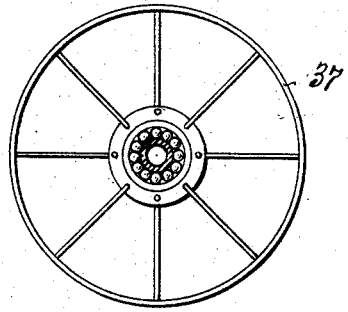
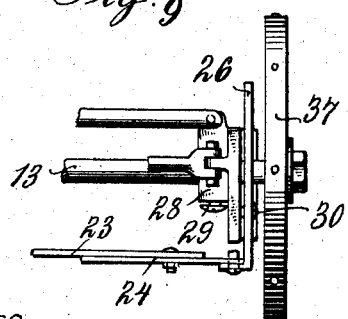
WITNESSES:
James F. Duhamel
W. H. Crichton-Clarke
INVENTOR:
Emil Franke,
By his Attorney
Victor J. Evans.

UNITED STATES PATENT OFFICE.

EMIL FRANKE, OF ASTORIA, NEW YORK.

LAWN-MOWER.

No. 865,097.   Specification of Letters Patent.   Patented Sept. 3, 1907.

Application filed October 7, 1905. Serial No. 281,831.

*To all whom it may concern:*

Be it known that I, EMIL FRANKE, a citizen of the United States, residing at Astoria, Long Island, in the county of Queens and State of New York, have invented new and useful Improvements in Lawn-Mowers, of which the following is a specification.

This invention relates to lawn mowers.

The principal object of the invention is, in a simple inexpensive, durable and thoroughly efficient manner, to combine a lawn mower and a bicycle.

With the foregoing and other objects in view, which will appear as the description proceeds, the invention resides in the combination and arrangement of parts and in the details of construction hereinafter described and claimed as a practical embodiment thereof.

In the accompanying drawing forming part of this specification;—Figure 1 is a side elevation, partly in section, showing a lawn mower combined with a bicycle in accordance with the present invention. Fig. 2 is a plan view. Fig. 3 is a section on the line 3—3 of Fig. 1. Fig. 4 is a section on the line 4—4 of Fig. 1. Fig. 5 is a plan view showing the lawn mower detached from the bicycle and equipped with a handle. Fig. 6 is a section on the line 6—6 of Fig. 5. Figs. 7, 8 and 9 are detailed views.

Like reference numerals indicate corresponding parts in the different figures of the drawing.

Referring particularly to Figs. 1 and 2, the numeral 1 indicates the rear wheel of a bicycle which may be of any suitable form and construction. The numeral 2 indicates a portion of the bicycle frame to which is secured a pair of clamps 3 and 4. The clamp 4 is attached in any suitable manner to a supporting member 5. Extending upward through the supporting member 5 is a pair of bolts 6 each having a nut 7, and a smooth shank 8 below the member 5. It will be apparent that the nuts 7 limit the downward movement of the bolts 6, and that the smooth shanks 8 will permit a slight upward movement for the purpose hereinafter to be described. The shanks 8 are formed upon a bracket 9 to which is pivotally connected or hinged in any suitable manner as indicated at 10, a frame 11. Extending through a bushing 12 formed upon the frame 11 is an axle 13 which is secured rigidly in position by means of a screw 14.

Mounted for rotation upon the axle 13 on the side of the frame nearest the bicycle wheel 1 is a ground wheel 15 which is retained in position by means of a nut 16 as shown in Figs. 3 and 4, and is formed with internal gear teeth 17.

Mounted upon the axle 13, between the ground wheel 15 and the frame 11, is a circular guide plate 18 which is intended to prevent grass which has been cut, from entering the ground wheel 15 and clogging the teeth thereof.

Journaled upon the frame 11 in any suitable manner, is a gear wheel 19 which is in mesh with the internal teeth 17, of the wheel 15. In addition to the peripheral teeth on the wheel 19 which are enmeshed with the wheel 17, said wheel 19 is also formed with a series of laterally projecting gear teeth 20 which extend through a suitable circular opening in the guard plate 18 and are enmeshed with a pinion 21 journaled upon the frame 11.

Eccentrically connected with the pinion 21 is an operating rod 22 which is suitably secured at its opposite end to a sliding cutter bar 23 which is mounted in any suitable manner upon the stationary cutter bar 24. The stationary cutter bar 24 is provided at its ends in any suitable manner with upwardly extending forked brackets such as 25 and 26. The forked bracket 25, as shown in Fig. 1, straddles the bushing 12 and is adjustable vertically by means of a screw 27 which extends through a suitable vertical slot formed in said bracket 25 and engages the frame 11. The forked bracket 26 straddles a projecting portion of a block 28 secured upon the axle 13 by means of a screw 29, as shown in Fig. 9. The bracket 26 is vertically adjustable by means of a screw 30. By adjusting the brackets 25 and 26, the cutter bars 23 and 24 may be raised or lowered to regulate the length of the grass which is to be cut.

The lawn mower structure is braced by means of a plurality of rods such as 31, 32 and 33. The rod 31 preferably is hinged or pivoted to the clamp 3 in any suitable manner as indicated at 34, and said rod at its lower end is slidably mounted by means of a pin 35 in the slot 36 formed in the frame 11. Mounted on the outer end of the axle 13 is a supporting wheel 37 which may be of any suitable form and construction. The wheels 15 and 37 preferably are provided with ball bearings as indicated in the drawing.

Constructed as above described, it will be understood that the bicycle is ridden in the ordinary manner in order to bring the lawn mower into operation. If the outer supporting wheel 37 should run over any obstruction, the whole lawn mower can swing upward on the hinged joint indicated by 10. This upward swinging of the lawn mower will be permitted by the bar 31 which as previously described is hinged at its upper end and slidably mounted at its lower end. If the ground wheel 15 should run over any obstruction, the smooth shanks 8 of the bolt 6 would permit the same to rise vertically with respect to the bicycle wheel.

Whenever so desired, the lawn mower may be detached from the bicycle by loosening the clamps 3 and 4. A handle such as 40 is then engaged by the bolts 6 and nut 7 as shown in Figs. 5 and 6. The handle 40 is formed with a forwardly projecting end 41 to which is secured the clamp 3. The rear end of the handle is bent upwardly at an angle as indicated. An extra brace rod 42 is employed for increasing the rigid connection between the handle and the lawn mower.

The improved device of this invention is strong, simple, durable and inexpensive in construction as well as thoroughly efficient in operation.

Changes in the precise embodiment of invention illustrated and described may be made within the scope of the following claims without departing from the spirit of the invention or sacrificing any of its advantages.

Having thus described the invention what is claimed as new is,—

1. The combination with a bicycle, of a lawn mower supported solely from the rear fork thereof, the lawn mower being connected for independent vertical movement relative to the bicycle.

2. The combination with a bicycle, of a lawn mower supported solely from the rear fork thereof, the lawn mower being mounted to permit independent movement of the end remote from the bicycle.

3. The combination of a bicycle, a frame pivotally connected therewith, a ground wheel journaled upon the frame, a movable cutter bar operated by the ground wheel, and a supporting wheel for the outer end of the cutter bar.

4. The combination of a bicycle, a supporting member adjustably secured thereto, a frame pivotally connected with the supporting member, an axle extending through the frame, an internally toothed ground wheel at one end of the axle, a supporting wheel at the other end of the axle, a stationary cutter bar having upwardly extending and vertically adjustable forked brackets, a movable cutter bar mounted upon the stationary cutter bar, gearing for operating the movable cutter bar from the toothed ground wheel, a guard plate mounted adjacent to the ground wheel and brace rods connected with said axle and said frame, substantially as described.

5. The combination with a bicycle, of a lawn mower supported solely from the rear fork thereof and comprising a frame mounted for a direct vertical movement and for a swinging vertical movement independent of the bicycle.

In testimony whereof, I have affixed my signature in presence of two witnesses.

EMIL FRANKE.

Witnesses:
JAMES PROWSE, Jr.,
RICHARD MUELLER.